(12) United States Patent
Shih et al.

(10) Patent No.: US 12,204,982 B1
(45) Date of Patent: Jan. 21, 2025

(54) USING A BARCODE TO FACILITATE SECURE NEAR-FIELD COMMUNICATION

(71) Applicant: The Code Corporation, Murray, UT (US)

(72) Inventors: Juihsiang Ray Shih, Shrewsbury, MA (US); Mansimran Singh, Lowell, MA (US)

(73) Assignee: THE CODE CORPORATION, Murray, UT (US)

( * ) Notice: Subject to any disclaimer, the term of this patent is extended or adjusted under 35 U.S.C. 154(b) by 0 days.

(21) Appl. No.: 18/346,492

(22) Filed: Jul. 3, 2023

(51) Int. Cl.
*G06K 7/10* (2006.01)
*G06K 19/06* (2006.01)
*G06K 19/077* (2006.01)

(52) U.S. Cl.
CPC ... *G06K 7/10821* (2013.01); *G06K 19/06028* (2013.01); *G06K 19/07758* (2013.01)

(58) Field of Classification Search
CPC ......... G06K 7/10821; G06K 19/06028; G06K 19/07758
See application file for complete search history.

(56) References Cited

U.S. PATENT DOCUMENTS

2016/0212613 A1* 7/2016 Huang .................... H04W 4/70

* cited by examiner

*Primary Examiner* — Matthew Mikels
(74) *Attorney, Agent, or Firm* — Thomas M. Hardman

(57) ABSTRACT

An object includes an NFC tag, which includes NFC data. The object also includes a barcode, which is an encoded representation of barcode data. When someone wants to access the NFC tag data, the object is presented to an object-reading system that includes both an NFC reader and a barcode reader. The barcode reader is used to read the barcode on the object in order to obtain the barcode data contained within the barcode. The barcode data is then used to establish a secure communication channel between the NFC tag in the object and the NFC reader. The NFC reader then utilizes the secure communication channel to read the NFC tag in the object.

20 Claims, 6 Drawing Sheets

USING A BARCODE TO FACILITATE SECURE NEAR-FIELD COMMUNICATION

CROSS-REFERENCE TO RELATED APPLICATIONS

N/A

BACKGROUND

The present disclosure is generally related to barcodes and barcode readers. The term "barcode" refers to an optical machine-readable representation of data. The term "barcode reader" refers to any device, or combination of devices, that is capable of identifying or extracting data from barcodes. The process of identifying or extracting data from a barcode can be referred to as reading (or scanning) a barcode. When a barcode is successfully read (or scanned) by a barcode reader, the data that is identified or extracted from the barcode can be referred to as decoded data.

An imaging-based barcode reader includes a camera for capturing one or more images of a barcode to be read. Once image(s) of a barcode have been captured by the camera, a barcode-decoding module processes the image(s) and attempts to decode (or, in other words, extract the data contained in) the barcode. As used herein, the term "barcode-decoding module" refers to any combination of software, firmware, and/or hardware that implements one or more barcode-decoding algorithms.

An imaging-based barcode reader can be a dedicated hardware device that is specifically designed for barcode reading. This type of device may be referred to as a dedicated barcode reader (or scanner). Alternatively, an imaging-based barcode reader can be a general-purpose computing device that includes a camera and that is equipped with software for reading barcodes. For example, mobile computing devices (e.g., smartphones, tablet computers) are frequently utilized for reading barcodes.

As used herein, the term "barcode reader" includes, but is not limited to, an imaging-based barcode reader.

As used herein, the term "imaging-based barcode reader" includes, but is not limited to, a dedicated barcode reader (or scanner). The term "imaging-based barcode reader" also includes, but is not limited to, a general-purpose computing device (e.g., a mobile computing device) that includes a camera and that is equipped with software for reading barcodes.

In the context of barcodes, the term "symbology" refers to a defined method of representing data using lines, spaces, shapes, and/or patterns. Broadly speaking, barcode symbologies are divided into two main types: one-dimensional (1D) barcode symbologies and two-dimensional (2D) barcode symbologies. 1D barcode symbologies represent data by varying the widths, spacings, and sizes of parallel lines. Some non-limiting examples of 1D barcode symbologies include UPC (Universal Product Code) and Code 128. 2D barcode symbologies use various shapes (e.g., rectangles, dots, hexagons) arranged in specific patterns to represent data. Some non-limiting examples of 2D barcode symbologies include QR (Quick Response) Code, Data Matrix, Maxicode, and Aztec.

As used herein, the term "1D barcode" refers to a barcode that has been encoded in accordance with a 1D barcode symbology. The term "2D barcode" refers to a barcode that has been encoded in accordance with a 2D barcode symbology. The term "barcode" may refer to either a 1D barcode or a 2D barcode.

The present disclosure is also generally related to near-field communication (NFC). NFC is a short-range wireless communication technology that allows two devices to exchange data when they are brought close together, typically within a few centimeters. NFC works by using magnetic field induction to establish a communication link between the devices, which enables them to exchange data such as contact information, payment details, and other types of digital content. NFC is commonly used for contactless payment systems, such as mobile payment applications and credit cards. It can also be used for other applications such as access control, data transfer between devices, and mobile ticketing.

As used herein, the term "NFC tag" refers to a device that stores data in such a way that the data can be accessed via NFC technology. An NFC tag is typically a relatively small device. An NFC tag may be a passive device that does not require power to function. The term "NFC reader" refers to any device, or combination of devices, that is capable of identifying or extracting data from NFC tags.

There are some security risks associated with NFC technology. Examples of such security risks include skimming and eavesdropping.

"Skimming" refers to the unauthorized act of intercepting and stealing data from an NFC-enabled device without the owner's knowledge or consent. Skimming can occur when a criminal uses a portable or hidden NFC reader to access the data stored on the victim's device, typically by getting close enough to the device to establish a communication link. Once the connection is made, the criminal can read and copy the data, which can include sensitive data such as credit card numbers, expiration dates, and security codes.

"Eavesdropping" refers to the act of intercepting and listening in on a communication link between two NFC-enabled devices, with the intention of gathering data. Unlike skimming, eavesdropping does not involve stealing data from the victim's device. Rather, eavesdropping involves intercepting data as it is transmitted between the devices.

The techniques disclosed herein can be utilized in connection with an electronic machine-readable travel document (eMRTD). An eMRTD is a type of travel document (e.g., a passport, a visa, an identity card) that has an embedded NFC tag containing data about the holder. The data is stored in a format that can be read by an NFC reader, allowing for faster processing of travelers at borders and other checkpoints.

An eMRTD includes a machine-readable zone (MRZ). An MRZ is a specially formatted area on an eMRTD. An MRZ typically takes the form of a few lines of text encoded with a series of characters (e.g., letters, numbers, and special symbols like "<"). An MRZ includes specific personal and document-related data, such as the document holder's name, nationality, date of birth, document number, and document expiry date.

Several security protocols are used to secure the data inside the NFC tag within an eMRTD. These security protocols include Basic Access Control (BAC) and Password Authenticated Connection Establishment (PACE). Both BAC and PACE utilize the data contained within an eMRTD's MRZ. The data in the MRZ of the eMRTD is read using optical character recognition (OCR), thereby generating OCR data. This OCR data is then used to establish a secure communication channel between the NFC tag in the eMRTD and the NFC reader.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to techniques for securing the data inside the NFC tag within an object. The techniques disclosed herein involve the use of barcodes and barcode readers.

As described above, with current approaches the MRZ of an eMRTD is used to establish a secure communication channel between an NFC tag in the eMRTD and an NFC reader. In accordance with the present disclosure, an eMRTD (or another type of document) includes a barcode, and this barcode is used to establish the secure communication channel.

More specifically, in accordance with one embodiment of the present disclosure, an object includes an NFC tag that has certain data stored therein. The data that is stored within the NFC tag may be referred to herein as "NFC tag data." The object also includes a barcode, which is an encoded representation of certain data. The data that is contained within the barcode may be referred to herein as "barcode data." As will be described in greater detail below, the barcode data can be used to implement one or more security protocols for securing the NFC tag data.

When someone wants to access the NFC tag data, the object is presented to an object-reading system that includes both an NFC reader and a barcode reader. The barcode reader is used to read the barcode on the object in order to obtain the barcode data contained within the barcode. The barcode data is then used to establish a secure communication channel between the NFC tag in the object and the NFC reader. The NFC reader then utilizes the secure communication channel to read the NFC tag in the object. In other words, the NFC reader obtains the NFC tag data from the NFC tag via the secure communication channel.

One benefit of the techniques disclosed herein is the fact that barcode reading is generally more accurate and reliable than OCR. OCR, which involves recognizing and interpreting text within images, has a higher propensity for errors due to complexities associated with different fonts, sizes, and styles of printed text, as well as variations in print quality and lighting conditions. These complexities can lead to misinterpretations and mistakes in OCR systems, making them generally less reliable than barcode reading for data capture tasks. Therefore, using barcodes to secure NFC tag data can be significantly more reliable than using OCR for that purpose.

This increased reliability can be beneficial in a variety of scenarios. In the context of eMRTDs, the failure of OCR can create a significant amount of additional manual work. For example, consider a scenario in which the NFC tag within an eMRTD includes biometric data (e.g., facial recognition data, fingerprint data) that is needed for authentication purposes. When OCR fails, the worker (e.g., border control officer) who is trying to verify the identity of the eMRTD holder may have to manually input the relevant data from the MRZ into the computer system being used in order to enable a secure communication channel to be created so that the biometric data within the NFC tag can be accessed in a secure manner. However, manually entering the data from the MRZ is both time consuming and error prone. Using a barcode instead of an MRZ provides a more reliable way to get the necessary data for establishing the secure communication channel, thereby significantly reducing the need for time consuming and error prone approaches that rely on manual input.

Another benefit of the techniques disclosed herein is the fact that OCR requires text characters to be fairly large in size. In addition, OCR works best when the text is being read on a flat surface. This limits the applicability of OCR-based security mechanisms to certain types of objects, such as eMRTDs, that have room for a large space devoted to text characters and that can be placed on a flat surface. In contrast, barcodes can be relatively small, and they can be read even when they are placed on a non-flat (e.g., curved, uneven) surface. Therefore, barcode-based security mechanisms can be utilized in connection with many more objects than OCR-based security mechanisms, including objects that are small and non-flat. Some non-limiting examples of objects that could utilize the techniques disclosed herein include an eMRTD, a patient identification wristband, a tracking label, a contactless payment card, and an access control card. Those skilled in the art will recognize additional objects with which the techniques disclosed herein can be utilized.

In some embodiments, the barcode can be encoded in accordance with a proprietary symbology. One example of a proprietary barcode symbology is GOCODE, which is owned by the assignee of the present application. Those skilled in the art will recognize other examples of proprietary barcode symbologies that could be utilized. Utilizing a proprietary barcode symbology can enhance data security. Because the symbology is proprietary, it is difficult for unauthorized individuals to read the encoded data. When used in connection with the techniques disclosed herein, a proprietary barcode symbology adds an additional layer of security for protecting the data within the NFC tag.

In some embodiments, an object-reading system that incorporates the techniques disclosed herein can utilize a dedicated barcode reader. Alternatively, an object-reading system can utilize a general-purpose computing device that includes a camera and that is equipped with software for decoding barcodes.

In some embodiments, an object-reading system can include OCR functionality in addition to having a barcode reader. Such an object-reading system is capable of reading different types of objects. For example, such an object-reading system is capable of reading an object that includes a barcode, by using the barcode reader. When this occurs, the barcode data can be used to establish a secure communication channel between an NFC tag in the object and an NFC reader in the object-reading system (as described above). In addition, such an object-reading system is capable of reading an object that includes a machine-readable zone (MRZ), by using the OCR functionality. When this occurs, the data that is included within the MRZ ("MRZ data") can be used to establish the secure communication channel between the NFC tag in the object and the NFC reader in the object-reading system.

In some embodiments, an object can include both a barcode as well as an MRZ. If the object-reading system includes a barcode reader and is also equipped with OCR functionality, then either the barcode data within the barcode or the MRZ data within the MRZ could be used to establish a secure communication channel for NFC communication. In such cases, the object-reading system can be configured with one or more rules that indicate which one should be used. In some embodiments, the object-reading system can be configured with a rule indicating that the barcode should be used to establish the secure communication channel in cases where an object includes both a barcode and an MRZ.

In some embodiments, the secure communication channel can be established in accordance with the Basic Access Control (BAC) security protocol. Alternatively, or in addition, the secure communication channel can be established in accordance with the Password Authenticated Connection Establishment (PACE) security protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
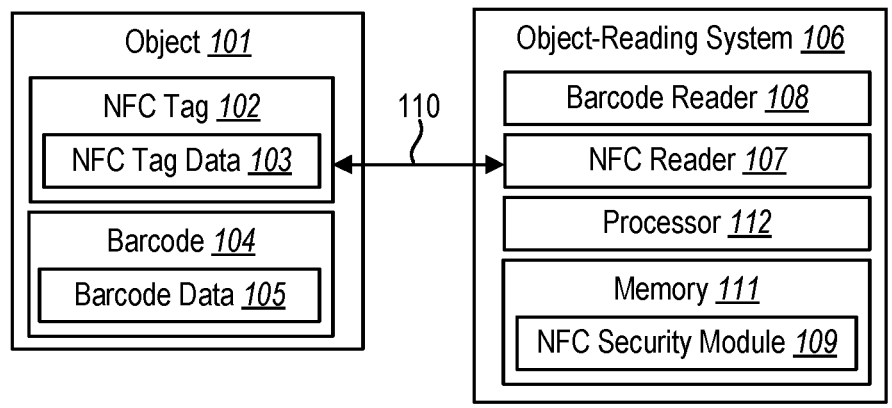
FIG. 1 illustrates an example of a system in which the techniques disclosed herein can be utilized, the system including an object having an NFC tag and an object-reading system having an NFC security module.

FIG. 1 illustrates an example of a system 100 in which the techniques disclosed herein can be utilized. The system 100 includes an object 101 and an object-reading system 106. The object-reading system 106 can be configured to read (or in other words, to extract data from) the object 101.

Many different types of objects 101 can be utilized in accordance with the techniques disclosed herein. The object 101 can be, for example, an eMRTD, a patient identification wristband, a tracking label, a contactless payment card, an access control card, or the like. In some embodiments, the object 101 can be a flat object. Alternatively, in other embodiments, the object 101 can be a non-flat object. In this context, the term "non-flat" refers to an object that does not have a smooth, level surface, and/or is not thin and relatively broad in relation to its other dimensions. A non-flat object can be three-dimensional, having depth in addition to length and width. A non-flat object may possess one or more uneven surfaces, be irregular in shape, and/or have one or more curved surfaces. A non-flat object may not lie perfectly flat on a surface. A non-flat object may be a type of object that cannot be accurately represented on a two-dimensional plane without losing some aspect of its structure.

The object 101 includes an NFC tag 102. Certain data is stored in the NFC tag 102. This data may be referred to herein as NFC tag data 103.

In some embodiments, the NFC tag data 103 may include sensitive data. In this context, the term "sensitive data" may refer to data that should be kept secure due to its personal, confidential, or proprietary nature.

The object 101 also includes a barcode 104. The barcode 104 is an encoded representation of certain data, which may be referred to herein as barcode data 105. The barcode data 105 is used to implement one or more security protocols for securing the NFC tag data 103.

The system also includes an object-reading system 106. The object-reading system includes an NFC reader 107. The NFC reader 107 is configured to read the NFC tag 102 within the object 101 in order to obtain the NFC tag data 103.

The object-reading system 106 also includes a barcode reader 108 that is configured to read the barcode 104 on the object 101 and obtain the barcode data 105. In some embodiments, the barcode reader 108 can be a dedicated barcode reader. Alternatively, the barcode reader 108 can be a general-purpose computing device that includes a camera and that is equipped with software for reading barcodes.

The barcode data 105 can be used to establish a secure communication channel 110 between the NFC tag 102 and the NFC reader 107. Establishing this secure communication channel 110 allows the NFC reader 107 to obtain the NFC tag data 103 from the NFC tag 102 in a secure manner. This can be important because, as indicated above, the NFC tag data 103 can include sensitive data.

The object-reading system 106 includes an NFC security module 109. The NFC security module 109 performs various operations related to the establishment of the secure communication channel 110. These operations will be described in greater detail below. In some embodiments, the NFC security module 109 can be implemented as instructions that are stored in memory 111 and executed by a processor 112 to perform the operations that are described herein in connection with the NFC security module 109.

Figure 2:
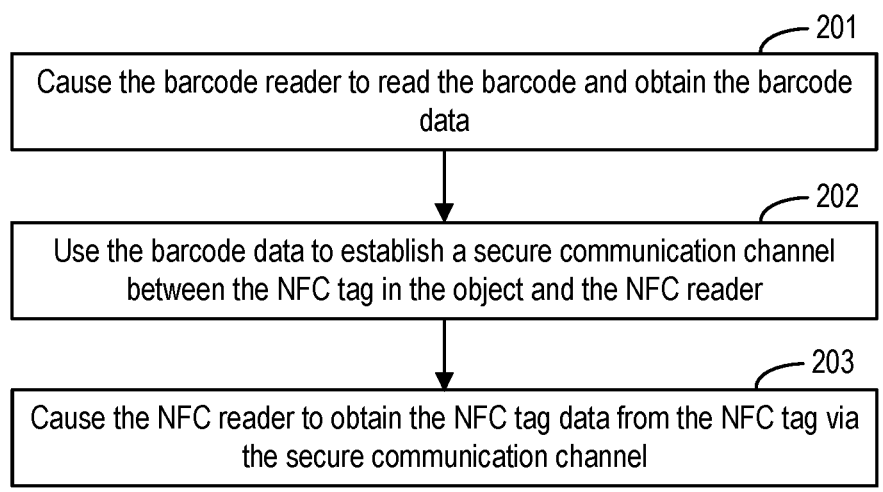
FIG. 2 illustrates an example of a method that can be performed by the NFC security module in the object-reading system shown in FIG. 1.

FIG. 2 illustrates an example of a method 200 that can be performed by the NFC security module 109. In some embodiments, the method 200 can be performed in response to an object 101 being presented to the object-reading system 106.

At 201, the NFC security module 109 causes the barcode reader 108 to read the barcode 104 on the object 101 and thereby obtain the barcode data 105. In some embodiments, the NFC security module 109 sends one or more commands to the barcode reader 108, and the command(s) cause the barcode reader 108 to read the barcode 104 on the object 101. In some embodiments, once the barcode reader 108 has read the barcode 104 and obtained the barcode data 105, the barcode reader 108 sends or provides the barcode data 105 to the NFC security module 109.

At 202, the NFC security module 109 uses the barcode data 105 to establish a secure communication channel 110 between the NFC tag 102 and the NFC reader 107. In some embodiments, the secure communication channel 110 can be established in accordance with the Basic Access Control (BAC) security protocol. Alternatively, or in addition, the secure communication channel 110 can be established in accordance with the Password Authenticated Connection Establishment (PACE) security protocol. Both BAC and PACE are described in standards produced by the International Civil Aviation Organization (ICAO). For example, ICAO Doc 9303 specifies standards for machine-readable travel documents (MRTDs), including eMRTDs. Part 11 of ICAO Doc 9303 describes security mechanisms for MRTDs, including BAC and PACE. BAC, which is based purely on symmetric cryptography, is described in Section 4.3 of Part 11 of ICAO Doc 9303. PACE, which employs asymmetric cryptography to provide higher entropy session keys, is described in Section 4.4 of Part 11 of ICAO Doc 9303. Sections 4.3 and 4.4 of Part 11 of ICAO Doc 9303 are hereby incorporated by reference.

At 203, the NFC security module 109 causes the NFC reader 107 to obtain the NFC tag data 103 from the NFC tag 102 via the secure communication channel 110. In some embodiments, the NFC security module 109 sends one or more commands to the NFC reader 107, and the command(s) cause the NFC reader 107 to read the NFC tag 102 such that the NFC tag data 103 is provided to the NFC reader 107 via the secure communication channel 110.

Figure 3:
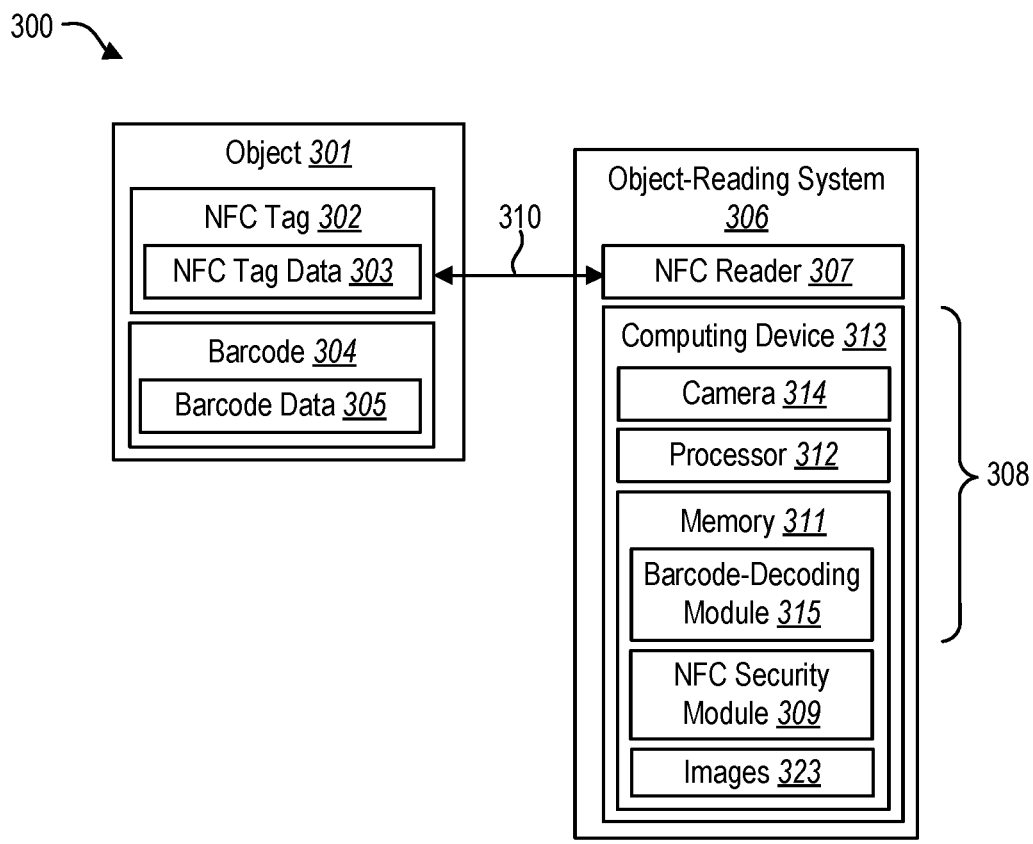
FIG. 3 illustrates another example of a system in which the techniques disclosed herein can be utilized, the system including a barcode reader that is implemented using a general-purpose computing device.

FIG. 3 illustrates another example of a system 300 in which the techniques disclosed herein can be utilized. The system 300 is similar to the system 100 described previously, except as indicated below.

In the system 300 shown in FIG. 3, the barcode reader 308 in the object-reading system 306 is implemented using a general-purpose computing device 313 that includes a camera 314 and that is equipped with software for reading barcodes. More specifically, the general-purpose computing device 313 includes a barcode-decoding module 315 that is stored in memory 311 and executed by a processor 312 to implement one or more barcode-decoding algorithms.

Figure 4:
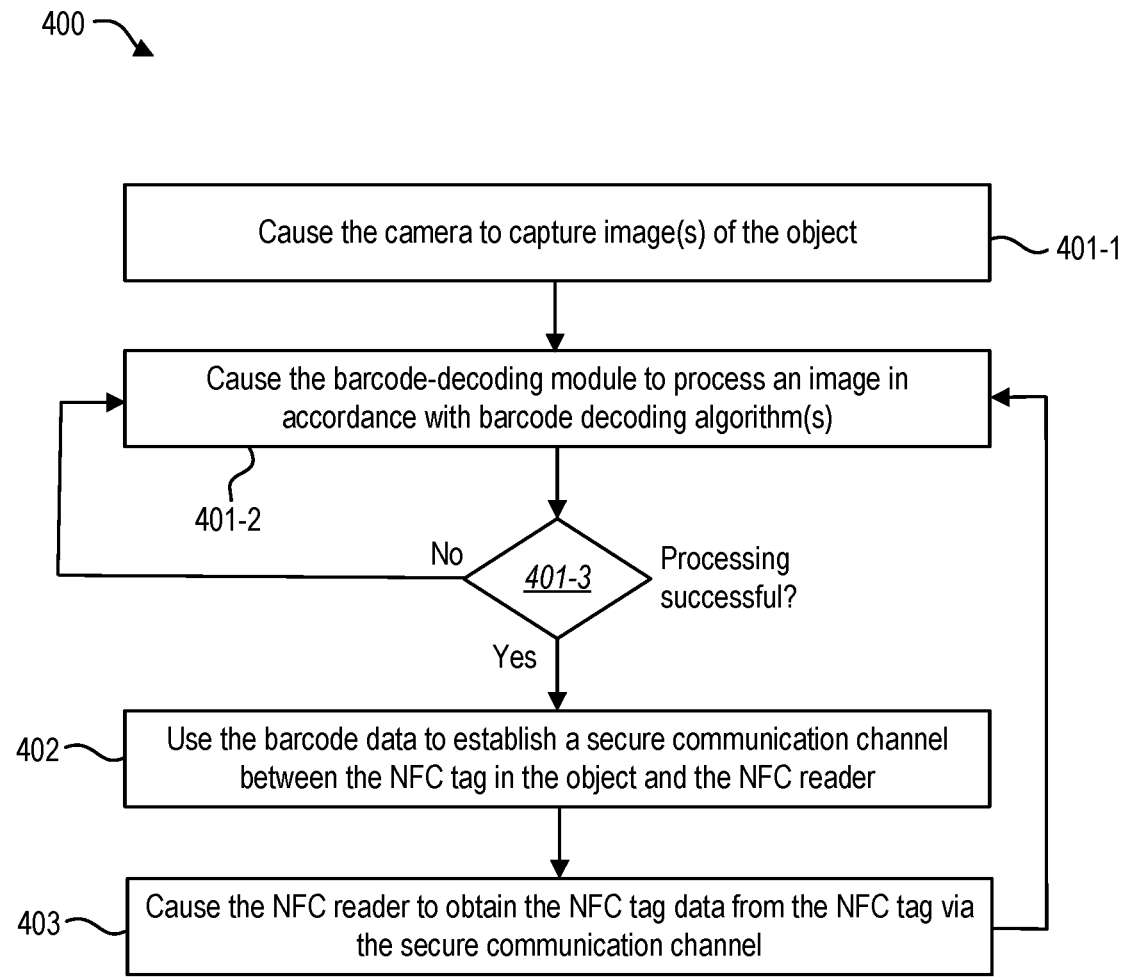
FIG. 4 illustrates an example of a method that can be performed by the NFC security module in the object-reading system shown in FIG. 3.

FIG. 4 illustrates an example of a method 400 that can be performed by the NFC security module 309 in the object-reading system 306. In some embodiments, the method 400 can be performed in response to an object 301 being presented to the object-reading system 306.

At 401-1, the NFC security module 309 causes the camera 314 to capture one or more images 323 of the object 301. In some embodiments, the NFC security module 309 sends one or more commands to the camera 314, and the command(s) cause the camera 314 to capture image(s) 323 of the object 301.

At 401-2, the NFC security module 309 causes the barcode-decoding module 315 to process an image 323 captured at 401-1 in accordance with one or more barcode-decoding algorithms. The purpose of this processing is to attempt to find a barcode 304 in the image 323, and if a barcode 304 is found, to attempt to decode the barcode.

At 401-3, the NFC security module 309 determines whether the processing performed at 401-2 is successful. In this context, the processing is considered to be successful if a barcode 304 is found in an image 323 and the barcode 304 is successfully decoded such that the corresponding barcode data 305 is obtained. In some embodiments, the barcode-decoding module 315 can indicate to the NFC security module 309 whether the processing performed at 401-2 is successful or unsuccessful, and the determination at 401-3 can be based on this indication.

Acts 401-1, 401-2, and 401-3 can be considered to be one non-limiting example of the way that act 201 in the method 200 shown in FIG. 2 can be performed.

If at 401-3 it is determined that the processing performed at 401-2 is not successful, then the method 400 returns to 401-2 and another image 323 is processed. On the other hand, if at 401-3 it is determined that the processing performed at 401-2 is successful, then the method 400 proceeds to 402.

At 402, the NFC security module 309 uses the barcode data 305 to establish a secure communication channel 310 between the NFC tag 302 and the NFC reader 307. At 403, the NFC security module 309 causes the NFC reader 307 to obtain the NFC tag data 303 from the NFC tag 302 via the secure communication channel 310. Acts 402 and 403 are similar to acts 202 and 203, respectively, in the method 200 described previously.

Figure 5:
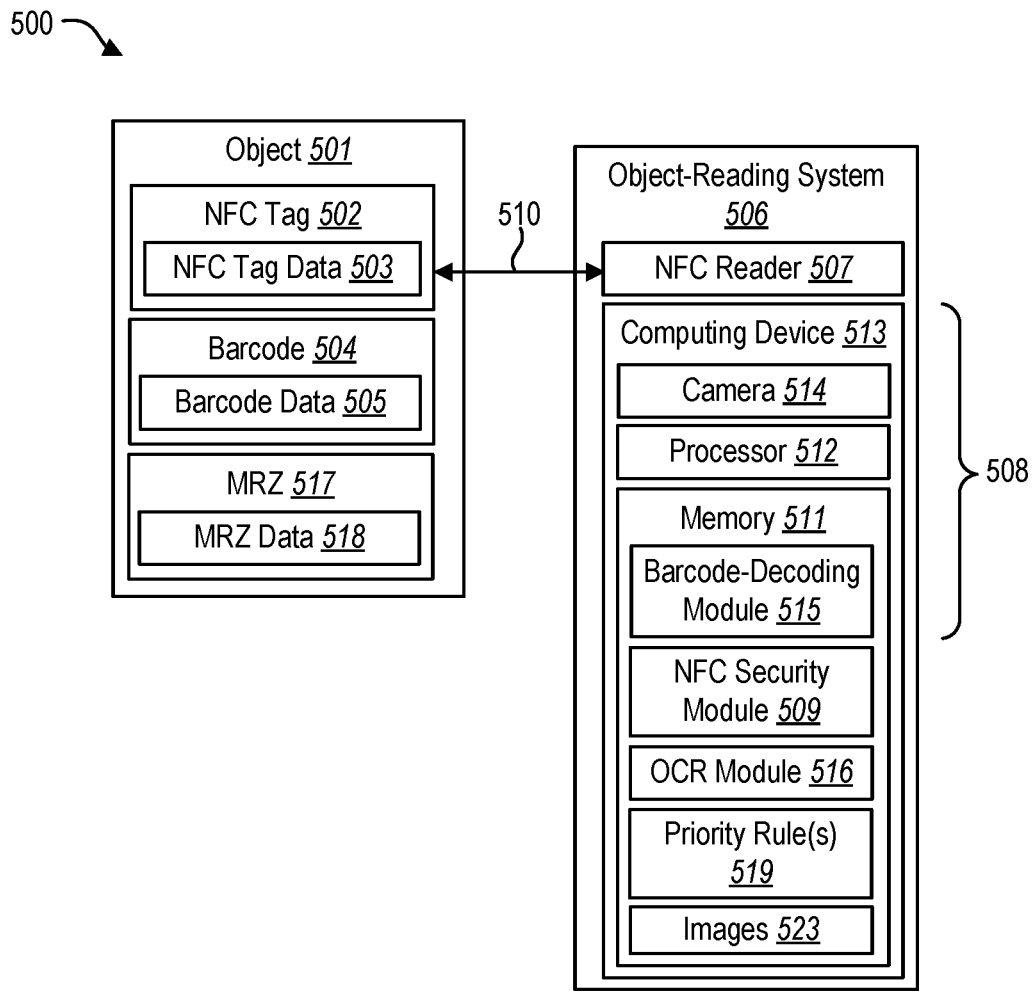
FIG. 5 illustrates another example of a system in which the techniques disclosed herein can be utilized, the system including an object-reading system that is capable of reading barcodes and that is also equipped with OCR functionality.

FIG. 5 illustrates another example of a system 500 in which the techniques disclosed herein can be utilized. The system 500 is similar to the system 300 described previously, except as indicated below.

In the system 500 shown in FIG. 5, the object-reading system 506 is capable of both (i) reading barcodes, and (ii) performing optical character recognition (OCR) on printed or written text characters.

With respect to (i), the object-reading system 506 includes a barcode reader 508. The barcode reader 508 is similar to the barcode reader 308 in the system 300 shown in FIG. 3. The barcode reader 508 is implemented using a general-purpose computing device 513 that includes a camera 514 and that is equipped with software for reading barcodes. More specifically, the general-purpose computing device 513 includes a barcode-decoding module 515 that is stored in memory 511 and executed by a processor 512 to implement one or more barcode-decoding algorithms. In an alternative embodiment, the object-reading system 506 could include a dedicated barcode reader.

With respect to (ii), the object-reading system 506 includes an OCR module 516. The OCR module 516 can be implemented as instructions that are stored in memory 511 and executed by a processor 512 to perform the functions that are described herein in connection with the OCR module 516.

The system 500 includes an object 501. The object 501 is similar in some respects to the objects 101, 301 described previously. The object 501 includes an NFC tag 502 with NFC tag data 503 stored therein. The object 501 also includes a barcode 504, which is an encoded representation of certain data that may be referred to herein as barcode data 505. The barcode data 505 can be used to implement one or more security protocols for securing the NFC tag data 503.

However, unlike the objects 101, 301 described previously, the object 501 also includes a machine-readable zone (MRZ) 517. The MRZ 517 includes certain data, which may be referred to herein as MRZ data 518. Like the barcode data 505, the MRZ data 518 can be used to implement one or more security protocols for securing the NFC tag data 503.

The object-reading system 500 includes an NFC reader 507, which is similar to the NFC readers 107, 307 in the systems 100, 300 described previously. The object-reading system 500 also includes an NFC security module 509. The NFC security module 509 is similar in some respects to the NFC security modules 109, 309 in the systems 100, 300 described previously. For example, the NFC security module 509 performs various operations related to the establishment of a secure communication channel 510 between the NFC tag 502 and the NFC reader 507. The NFC security module 509 can be implemented as instructions that are stored in memory 511 and executed by a processor 512 to perform the operations that are described herein in connection with the NFC security module 509. The NFC security module 509 is capable of using the barcode data 505 to establish the secure communication channel 510.

In addition to being able to use the barcode data 505 to establish the secure communication channel 510, the NFC security module 509 is also capable of using the MRZ data 518 to establish the secure communication channel 510. The decision about which piece(s) of data should be used can be based on one or more priority rules 519 maintained by the object-reading system 506. The priority rule(s) 519 will be described in greater detail below.

Figure 6:
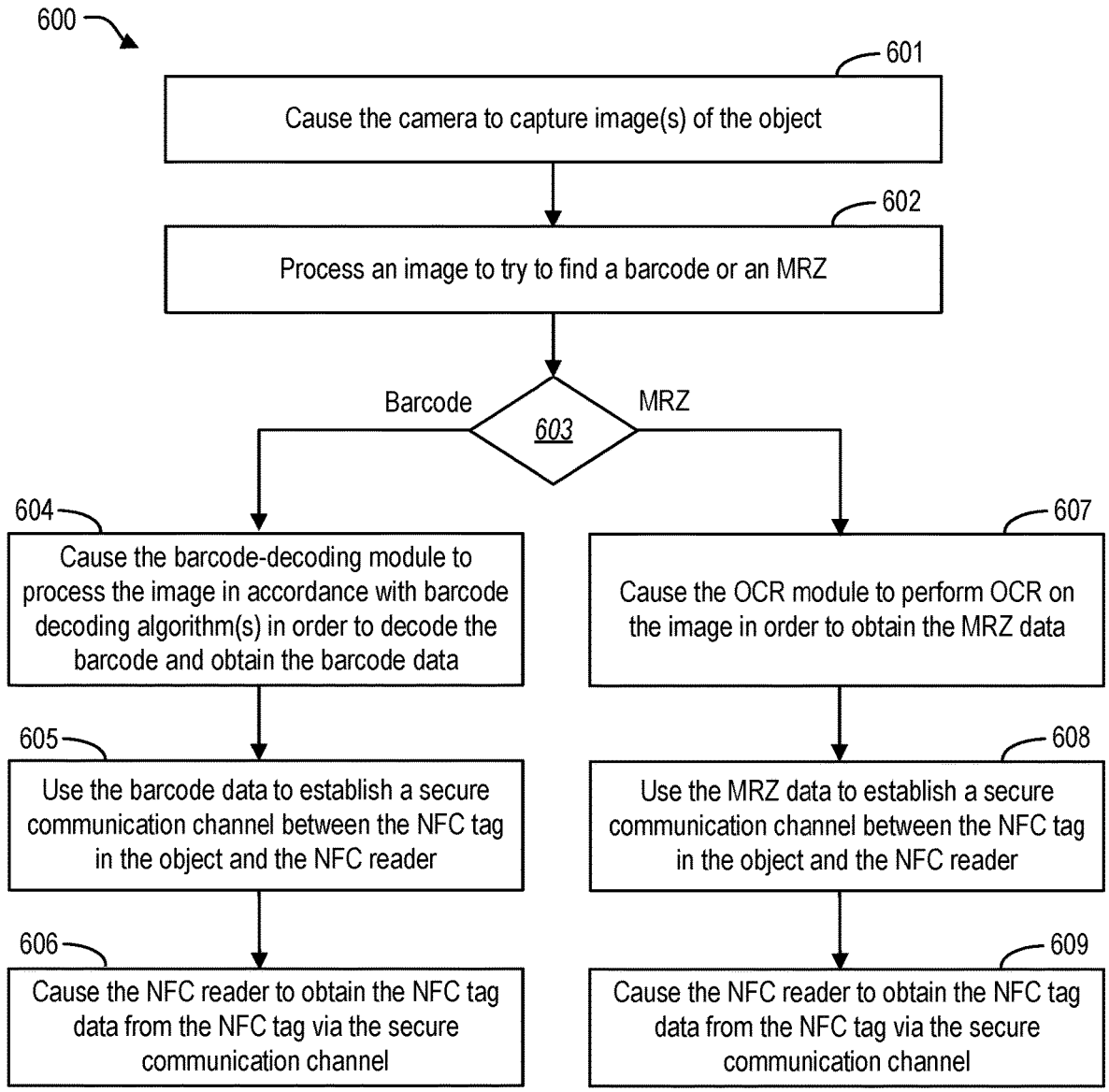
FIG. 6 illustrates an example of a method that can be performed by the NFC security module in the system shown in FIG. 5, the method being applicable to a scenario in which the object includes either a barcode or an MRZ.

FIG. 6 illustrates an example of a method 600 that can be performed by the NFC security module 509 in the system 500 shown in FIG. 5. The method 600 can be performed in response to an object 501 being presented to the object-reading system 506. The method 600 is applicable to a scenario in which the object 501 includes either a barcode 504 or an MRZ 517, but not both. (A scenario in which the object 501 includes both a barcode 504 and an MRZ 517 will be described below.)

At 601, the NFC security module 509 causes the camera 514 to capture one or more images 523 of the object 501. In some embodiments, the NFC security module 509 sends one or more commands to the camera 514, and the command(s) cause the camera 514 to capture image(s) 523 of the object 501.

At 602, the NFC security module 509 processes an image 523 to try to find a barcode 504 or an MRZ 517 in the image 523. In some embodiments, the NFC security module 509 processes the image 523 in accordance with one or more barcode-recognition algorithms in order to detect the presence of a barcode 504 in the image 523. Alternatively, or in addition, the NFC security module 509 processes the image 523 in accordance with one or more text-recognition algorithms in order to detect the presence of an MRZ 517 in the image 523. At 603, the NFC security module 509 determines, based on the processing done at 602, whether the image 523 includes a barcode 504 or an MRZ 517.

If at 603 it is determined that the image 523 includes a barcode 504, then the method 600 proceeds to 604. At 604, the NFC security module 509 causes the barcode-decoding module 315 to process the image 523 in accordance with one or more barcode-decoding algorithms. For purposes of the present discussion, it will be assumed that the processing performed at 604 finds a barcode 504 in the image 523 and successfully decodes the barcode 504 in order to obtain the barcode data 505.

At 605, the NFC security module 509 uses the barcode data 505 to establish a secure communication channel 510 between the NFC tag 502 in the object 501 and the NFC reader 507. At 606, the NFC security module 509 causes the NFC reader 507 to obtain the NFC tag data 503 from the NFC tag 502 via the secure communication channel 510.

Acts 605 and 606 are similar to acts 202 and 203, respectively, in the method 200 described previously.

If at 603 it is determined that the image 523 includes an MRZ 517, then the method 600 proceeds to 607. At 607, the NFC security module 509 causes the OCR module 516 to perform OCR on the image 523 captured at 601 in order to obtain the MRZ data 518. Some non-limiting examples of OCR algorithms/programs/engines/APIs that could be used include Tesseract OCR, GOCR, Keras-OCR, OCR.space, etc.

At 608, the NFC security module 509 uses the MRZ data 518 to establish a secure communication channel 510 between the NFC tag 502 in the object 501 and the NFC reader 507. This is similar to act 605, except that the MRZ data 518 is being used instead of the barcode data 505 to establish the secure communication channel 510.

At 609, the NFC security module 109 causes the NFC reader 107 to obtain the NFC tag data 103 from the NFC tag 102 via the secure communication channel 110. This is similar to act 606.

Figure 7:
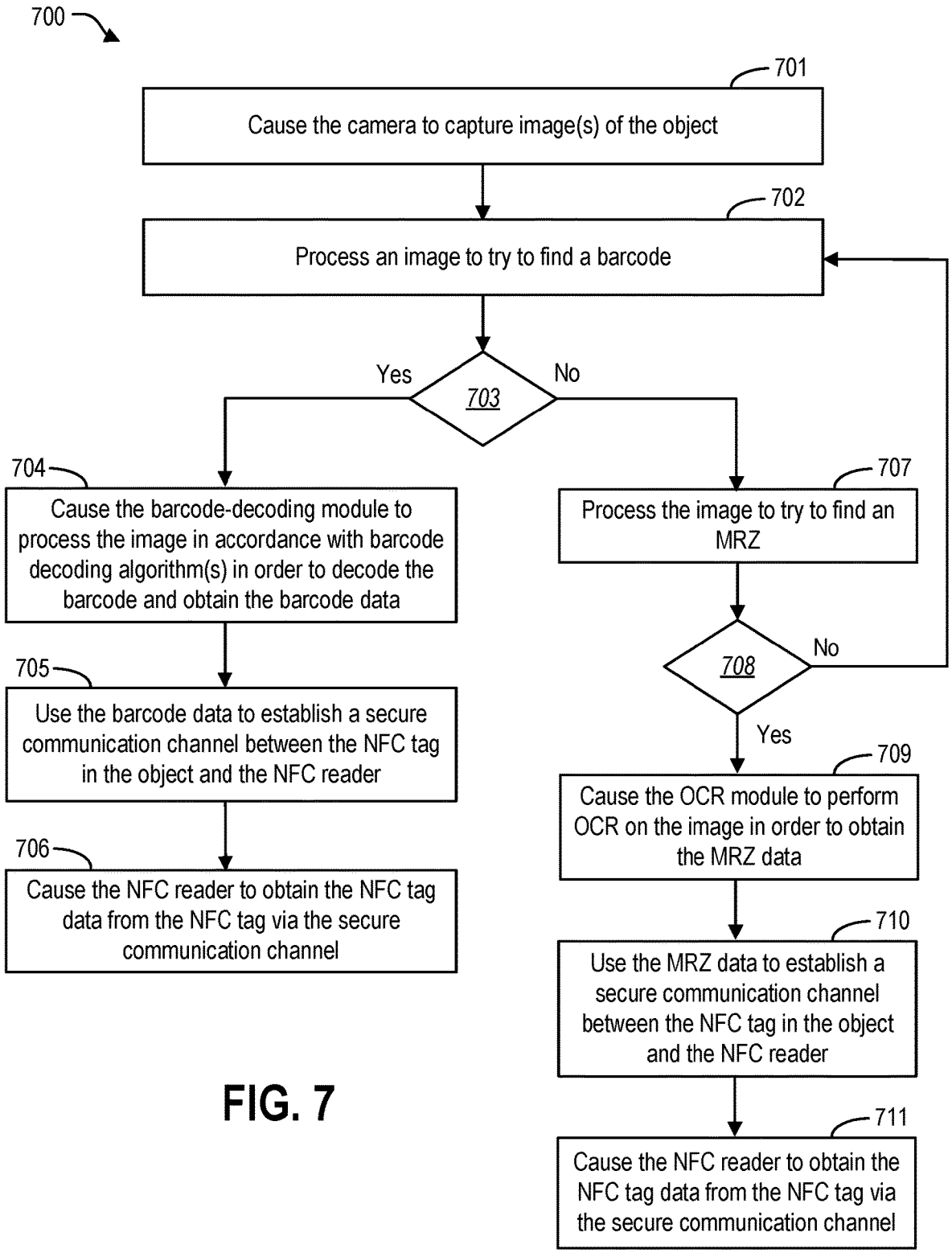
FIG. 7 illustrates another example of a method that can be performed by the NFC security module in the system shown in FIG. 5, the method being applicable to a scenario in which the object includes both a barcode and an MRZ.

FIG. 7 illustrates another example of a method 700 that can be performed by the NFC security module 509 in the system 500 shown in FIG. 5. The method 700 can be performed in response to an object 501 being presented to the object-reading system 506. The method 700 is applicable to a scenario in which the object 501 includes both a barcode 504 and an MRZ 517. For this method 700, it will be assumed that the object-reading system 506 includes a priority rule 519 which indicates that a barcode 504 should be prioritized over an MRZ 517 when both are present in an object 501.

At 701, the NFC security module 509 causes the camera 514 to capture one or more images 523 of the object 501. This is similar to act 601 in the method 600 shown in FIG. 6.

At 702, the NFC security module 509 processes an image 523 captured at 701 to try to find a barcode 504 in the image 523. In this method 700, the NFC security module 509 first looks for a barcode 504 in the image 523 because of the priority rule 519 described above. The NFC security module 509 can process the image 523 in accordance with one or more barcode-recognition algorithms in order to detect the presence of a barcode 504 in the image 523.

At 703, the NFC security module 509 determines, based on the processing done at 702, whether the image 523 includes a barcode 504. If at 703 it is determined that the image 523 includes a barcode 504, then the method 700 proceeds to 704.

At 704, the NFC security module 509 causes the barcode-decoding module 515 to process the image 523 in accordance with one or more barcode-decoding algorithms. For purposes of the present discussion, it will be assumed that the processing performed at 704 successfully decodes the barcode 504 in order to obtain the barcode data 505.

At 705, the NFC security module 509 uses the barcode data 505 to establish a secure communication channel 510 between the NFC tag 502 in the object 501 and the NFC reader 507. At 706, the NFC security module 509 causes the NFC reader 507 to obtain the NFC tag data 503 from the NFC tag 502 via the secure communication channel 510. Acts 705 and 706 are similar to acts 202 and 203, respectively, in the method 200 described previously.

If at 703 it is determined that the image 523 does not include a barcode 504, then the method 700 proceeds to 707. At 707, the NFC security module 509 processes the image 523 to try to find an MRZ 517 in the image 523. In some embodiments, the NFC security module 509 processes the image 523 in accordance with one or more text-recognition algorithms to try to detect the presence of an MRZ 517 in the image 523.

At 708, the NFC security module 509 determines, based on the processing done at 707, whether the image 523 includes an MRZ 517. If at 708 it is determined that the image 523 does not include an MRZ 517, then the method 700 returns to 702 and another image 523 is processed.

If at 708 it is determined that the image 523 includes an MRZ 517, then the method 700 proceeds to 709. At 709, the NFC security module 509 causes the OCR module 516 to perform OCR on the image 523 in order to obtain the MRZ data 518. This is similar to act 607 in the method 600 described previously.

At 710, the NFC security module 509 uses the MRZ data 518 to establish a secure communication channel 510 between the NFC tag 502 in the object 501 and the NFC reader 507. At 711, the NFC security module 109 causes the NFC reader 507 to obtain the NFC tag data 503 from the NFC tag 502 via the secure communication channel 510. Acts 710 and 711 are similar to acts 608 and 609, respectively, in the method 600 described previously.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic data. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read data from and/or write data to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving data), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system comprising:
   an object comprising:
      a near-field communication (NFC) tag comprising NFC tag data; and
      a barcode comprising an encoded representation of barcode data that can be used to implement a security protocol for securing the NFC tag data; and an object-reading system comprising a barcode reader, an NFC reader, a processor, memory communicatively coupled to the processor, and instructions stored in the memory, wherein the instructions are executable by the processor to:
cause the barcode reader to read the barcode and obtain the barcode data;
use the barcode data to establish a secure communication channel between the NFC tag in the object and the NFC reader, wherein the secure communication channel is established in accordance with at least one of the Basic Access Control (BAC) security protocol or the Password Authenticated Connection Establishment (PACE) security protocol; and
cause the NFC reader to obtain the NFC tag data from the NFC tag via the secure communication channel.

2. The system of claim 1, wherein the object is non-flat.

3. The system of claim 1, wherein the barcode is encoded in accordance with a proprietary symbology.

4. The system of claim 1, wherein the object is selected from the group consisting of an electronic machine-readable travel document (eMRTD), a patient identification wristband, a tracking label, a contactless payment card, or an access control card.

5. The system of claim 1, wherein the barcode reader is a dedicated barcode reader.

6. The system of claim 1, wherein:
the object-reading system comprises a general-purpose computing device that comprises the processor, the memory, and a camera;
the object-reading system comprises a barcode-decoding module stored in the memory and executable by the processor to implement at least one barcode-decoding algorithm; and
the barcode reader comprises the camera and the barcode-decoding module.

7. The system of claim 6, wherein causing the barcode reader to read the barcode comprises:
causing the camera to capture one or more images of the object; and
causing the barcode-decoding module to process the one or more images in accordance with the at least one barcode-decoding algorithm.

8. A system comprising:
an object comprising a near-field communication (NFC) tag comprising NFC tag data, a barcode comprising an encoded representation of barcode data that can be used to implement a security protocol for securing the NFC tag data, and a machine-readable zone (MRZ) comprising MRZ data that can also be used to implement the security protocol for securing the NFC tag data; and
an object-reading system comprising a barcode reader, an NFC reader, an optical character recognition (OCR) module that is configured to perform OCR on an image of the MRZ in order to obtain the MRZ data, a processor, memory communicatively coupled to the processor, and instructions stored in the memory, wherein the instructions are executable by the processor to:
cause the barcode reader to read the barcode and obtain the barcode data;
use the barcode data to establish a secure communication channel between the NFC tag in the object and the NFC reader; and
cause the NFC reader to obtain the NFC tag data from the NFC tag via the secure communication channel.

9. The system of claim 8, wherein the secure communication channel is established in accordance with the Basic Access Control (BAC) security protocol.

10. The system of claim 8, wherein the secure communication channel is established in accordance with the Password Authenticated Connection Establishment (PACE) security protocol.

11. The system of claim 8, wherein the instructions are additionally executable by the processor to:
determine, based on a pre-defined rule, that the barcode should be prioritized over the MRZ for establishing the secure communication channel; and
search for the barcode in a captured image before searching for the MRZ.

12. The system of claim 8, wherein the object is non-flat.

13. The system of claim 8, wherein the barcode is encoded in accordance with a proprietary symbology.

14. The system of claim 8, wherein the object is selected from the group consisting of an electronic machine-readable travel document (eMRTD), a patient identification wristband, a tracking label, a contactless payment card, or an access control card.

15. The system of claim 8, wherein the barcode reader is a dedicated barcode reader.

16. The system of claim 8, wherein:
the object-reading system comprises a general-purpose computing device that comprises the processor, the memory, and a camera;
the object-reading system comprises a barcode-decoding module stored in the memory and executable by the processor to implement at least one barcode-decoding algorithm; and
the barcode reader comprises the camera and the barcode-decoding module.

17. A system comprising:
an object selected from the group consisting of an electronic machine-readable travel document (eMRTD), a patient identification wristband, a tracking label, a contactless payment card, or an access control card, the object comprising:
a near-field communication (NFC) tag comprising NFC tag data; and
a barcode comprising an encoded representation of barcode data that can be used to implement a security protocol for securing the NFC tag data; and
an object-reading system comprising a barcode reader, an NFC reader, a processor, memory communicatively coupled to the processor, and instructions stored in the memory, wherein the instructions are executable by the processor to:
cause the barcode reader to read the barcode and obtain the barcode data;
use the barcode data to establish a secure communication channel between the NFC tag in the object and the NFC reader; and
cause the NFC reader to obtain the NFC tag data from the NFC tag via the secure communication channel.

18. The system of claim 15, wherein the secure communication channel is established in accordance with the Basic Access Control (BAC) security protocol.

19. The system of claim 15, wherein the secure communication channel is established in accordance with the Password Authenticated Connection Establishment (PACE) security protocol.

20. The system of claim 15, wherein:
the object-reading system comprises a computing device that comprises the processor, the memory, and a camera;
the object-reading system comprises a barcode-decoding module stored in the memory and executable by the processor to implement at least one barcode-decoding algorithm; and
the barcode reader comprises the camera and the barcode-decoding module.

* * * * *